(12) United States Patent
Lechnick et al.

(10) Patent No.: US 7,811,361 B2
(45) Date of Patent: Oct. 12, 2010

(54) PROCESS FOR A GAS REMOVAL ZONE

(75) Inventors: William J. Lechnick, Glen Ellyn, IL (US); Lamar A. Davis, West Dundee, IL (US); David Alden Bahr, Chicago, IL (US); Carla F. Roberts, Wheeling, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/494,794

(22) Filed: Jun. 30, 2009

(65) Prior Publication Data

US 2010/0132555 A1  Jun. 3, 2010

(51) Int. Cl.
    *B01D 53/14* (2006.01)
(52) U.S. Cl. .............................. 95/172; 95/176; 95/177; 95/192; 95/199; 95/203; 95/204; 95/228; 95/235; 95/236
(58) Field of Classification Search .................. 95/235, 95/172, 176–177, 192, 199, 208, 228–229, 95/203, 204, 236; 96/234, 242; 423/437.1, 423/563
See application file for complete search history.

(56) References Cited

U.S. PATENT DOCUMENTS

| | | | | |
|---|---|---|---|---|
| 2,273,075 A | * | 2/1942 | Weems | |
| 3,166,495 A | * | 1/1965 | Parks | 208/340 |
| 3,544,269 A | * | 12/1970 | Rushton | 423/320 |
| 4,242,108 A | * | 12/1980 | Nicholas et al. | 95/166 |
| 4,568,364 A | * | 2/1986 | Galstaun et al. | |
| 4,663,135 A | * | 5/1987 | Miller | |
| 4,793,841 A | * | 12/1988 | Burr | |
| 4,853,012 A | * | 8/1989 | Batteux et al. | 95/174 |
| 5,137,550 A | * | 8/1992 | Hegarty et al. | 95/174 |
| 6,090,356 A | | 7/2000 | Jahnke et al. | |

(Continued)

FOREIGN PATENT DOCUMENTS

WO  WO-2008/103467 A1  8/2008

OTHER PUBLICATIONS

Friha, CO2 Recovery from CO2 Removal Unit at GL1Z Plant, Gas Technology Institute—15th International Conference and Exhibition on Liquified Natural Gas 2007, 2007, Number Paper PS7-4, pp. PS7-4.1-PS7-4.8.

(Continued)

*Primary Examiner*—Duane Smith
*Assistant Examiner*—Ives Wu
(74) *Attorney, Agent, or Firm*—Mark Goldberg

(57) ABSTRACT

One exemplary embodiment can be a process for increasing an efficiency of an acid gas removal zone. The process can include sending a sour gas stream including at least one gas to a first absorber providing an overhead stream absorbing the at least one gas; withdrawing a side-stream from the first absorber and passing the side-stream through a holding tank, a side-stream fluid transfer device, and a side-stream chiller before returning the side-stream to the absorber; and passing the first absorber overhead stream to a pump-around circuit for a second absorber. Usually, the pump-around circuit may include a flash drum, a pump-around fluid transfer device and a pump-around chiller before providing a slipstream to the first absorber and another portion to the second absorber.

2 Claims, 2 Drawing Sheets

U.S. PATENT DOCUMENTS

| | | | |
|---|---|---|---|
| 6,645,459 B2 | 11/2003 | Lynn | |
| 7,147,691 B2 * | 12/2006 | Palmer | 95/186 |
| 7,192,468 B2 * | 3/2007 | Mak et al. | |
| 7,424,808 B2 | 9/2008 | Mak | |
| 2003/0103884 A1 | 6/2003 | Lynn | |
| 2004/0003717 A1 * | 1/2004 | Gaskin | 95/176 |
| 2005/0172807 A1 * | 8/2005 | Mak | 95/235 |
| 2006/0150812 A1 * | 7/2006 | Mak et al. | 95/199 |
| 2006/0196357 A1 | 9/2006 | Menzel | |
| 2006/0266214 A1 | 11/2006 | Won | |
| 2008/0019899 A1 | 1/2008 | Mak et al. | |
| 2008/0187485 A1 | 8/2008 | Magne-Drisch et al. | |
| 2009/0031630 A1 | 2/2009 | Naphad et al. | |
| 2009/0178497 A1 * | 7/2009 | Tsai | 73/864.01 |

OTHER PUBLICATIONS

King, Reformulated Solvent Cuts H2S; Slips CO2, Chemical Processing, Apr. 1991, vol. 47, No. 9, pp. 64, 66.

Molburg et al., Comparison of Salient Features of Alternative CO2 Recovery Processes, AWMA 87th Annual Meeting Paper, 1994, Number Paper N. 94-RA113.03, pp. 1-16.

Robertson et al., Increase H2S/CO2 Selectivity With Absorber Interstage Cooling, LRGCC Conf. Proc. 54, 2004, pp. 21-29.

Towler et al., Sulfur Recovery with Reduced Emissions, Low Capital Investment and Hydrogen Co-Production, Chemical Eng. Commun., 1996, vol. 155, pp. 113-143.

Weinberg et al., New Gas Treating Alternatives for Saving Energy in Refining and Natural Gas Production, Energy Conservation in the Production, Processing and Use of Petroleum, No. 1, Publisher: 11th World Petroleum Congress 1983, vol. RTD10, pp. 177-187.

* cited by examiner

PROCESS FOR A GAS REMOVAL ZONE

FIELD OF THE INVENTION

This invention generally relates to a process for a gas removal zone, such as an acid gas removal zone.

DESCRIPTION OF THE RELATED ART

Often, a sour gas, such as a syngas, from a gasifier is treated with a solvent in at least one absorber to selectively remove one or more sulfur compounds, such as a hydrogen sulfide or a carbonyl sulfide, and carbon dioxide. Usually, the solvent, which can be in a liquid phase, flows in a circuit to and from the one or more absorbers at a solvent circulation rate. Generally, these absorbers have relatively high capital and operating costs. Typically, a side draw can be chilled from an upper half of the hydrogen sulfide absorber to reduce the solvent circulation rate, and thus reducing utility costs usually from about 2-about 5%. The chilling may reduce the solvent circulation rate by negating the adverse affects of the exotherm that results from carbon dioxide absorption at the top of an absorber. Moreover, additional chilling may be required as the pressure and the carbon dioxide concentration of the feed increases.

However, lower solvent circulation rates may not economically justify chilling due to increases in the hydrogen sulfide absorber capital costs. Typically, the hydrogen sulfide absorber costs may increase due to the residence time requirements, usually about 30-about 180 seconds for the liquid trap-out tray that may feed a side draw pump. These residence time requirements, which are typically needed to prevent a dry running of the pump for extended time periods, can add anywhere from about 1.5-about 13 meters to the height of an absorber column. Consequently, there can be a desire to utilize the benefits of chilling without incurring the expense of increasing the size of the absorber column.

SUMMARY OF THE INVENTION

One exemplary embodiment can be a process for increasing an efficiency of an acid gas removal zone. The process can include sending a sour gas stream, including at least one gas, to a first absorber providing an overhead stream absorbing the at least one gas; withdrawing a side-stream from the first absorber and passing the side-stream through a holding tank, a side-stream fluid transfer device, and a side-stream chiller before returning the side-stream to the absorber; and passing the first absorber overhead stream to a pump-around circuit for a second absorber. Usually, the pump-around circuit may include a flash drum, a pump-around fluid transfer device and a pump-around chiller before providing a slipstream to the first absorber and another portion to the second absorber.

Another exemplary embodiment can be a process for increasing an efficiency of an acid gas removal zone. Typically, the process includes sending a sour gas stream to an absorber and extracting a side-stream passing through a holding tank before entering a pump and then a chiller. Afterwards, the chilled side-stream can be returned to the absorber.

Yet another exemplary embodiment may be a process for increasing an efficiency of an acid gas removal zone. The process can include passing a hydrogen sulfide absorber effluent to a pump-around circuit for a carbon dioxide absorber. Usually, the pump-around circuit includes a flash drum, a fluid transfer device, and a chiller.

The embodiments provided herein can allow the efficient use of a hydrogen sulfide absorber, and avoid the necessity of increasing its size. In one exemplary embodiment, the solvent can be saturated with carbon dioxide prior to entering the hydrogen sulfide absorber. The overhead stream from the absorber can be sent to a flash tank where vapor and liquid streams are separated. A slipstream from the liquid stream can be chilled to remove heat associated with the carbon dioxide absorption exotherm and then provided back to the hydrogen sulfide absorber, thereby effectively providing at least one extra contact stage.

In addition, the hydrogen sulfide absorber can have a side-stream withdrawn and be chilled prior to being returned to the absorber. Using such a chiller can reduce the height requirements of the absorber up to about one-third to about one-half and remove the heat associated with the carbon dioxide absorption exotherm. Preferably, a holding tank is utilized in conjunction with the chiller to provide the necessary residence time to prevent a pump from running dry. Particularly, often a pump is associated with the chiller. Utilizing the holding tank can provide sufficient capacity to prevent the pump from running dry. Generally, the addition of such a tank is less costly than increasing the absorber height by providing a direct pumped and chilled side-stream. As a consequence, using the chiller and holding tank in conjunction with a pump can effectively reduce absorber height.

DEFINITIONS

As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 ... Cn where "n" represents the number of carbon atoms in the one or more hydrocarbon molecules. Additionally, characterizing a stream as, e.g., a "partially-lean solvent stream" or a "lean solvent stream" can mean a stream including or rich in, respectively, at least one partially-lean solvent or lean solvent.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "vapor" can mean a gas or a dispersion that may include or consist of one or more hydrocarbons.

As used herein, the term "cooler" can mean a device cooling a fluid with water.

As used herein, the term "chiller" can mean a device cooling a fluid to a temperature below that obtainable by only using water. Typically, a chiller may use a refrigerant such as an ammonia or a hydrofluorocarbon.

As used herein, the term "rich" can mean an amount of generally at least about 30%, or about 30%-about 70%, by mole, of a compound or class of compounds in a stream.

As used herein, the term "absorber" can include an adsorber, and relates, but is not limited to, absorption and/or adsorption.

As depicted, process flow lines in the figures can be referred to as lines, effluents, streams, or portions. Particularly, a line can contain one or more effluents, streams or portions.

DETAILED DESCRIPTION

Figure 1:
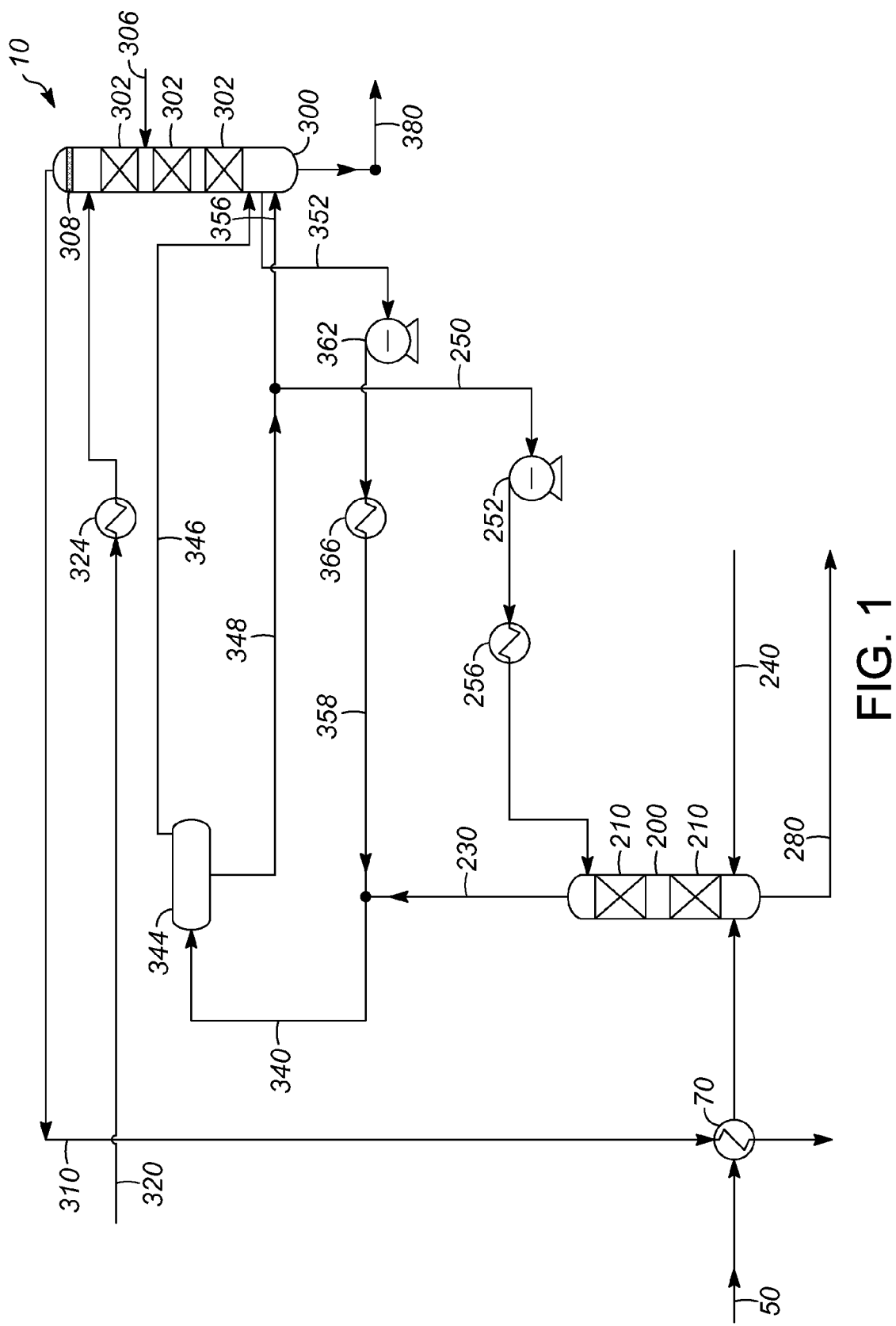
FIG. 1 is a schematic depiction of an exemplary acid gas removal zone.

Referring to FIG. 1, one exemplary acid gas removal zone 10 can include a first absorber 200 and a second absorber 300. Typically, the first absorber 200 is a hydrogen sulfide absorber 200 and the second absorber 300 is a carbon dioxide absorber 300. Although the absorbers 200 and 300 are characterized as hydrogen sulfide or carbon dioxide absorbers, it should be understood that other gases may be absorbed, such as, respectively, carbon dioxide or hydrogen sulfide, and/or carbonyl sulfide.

Suitable conditions for the hydrogen sulfide absorber 200 can include a temperature of about 4-about 60° C., preferably about 30-about 50° C., and a pressure of about 3,400-about 17,500 kPa, preferably about 7,000 kPa. The carbon dioxide absorber 300 can operate at a pressure of about 2,700-about 7,000 kPa and a temperature of about −2-about 25° C. Exemplary absorbers, including hydrogen sulfide and carbon dioxide absorbers, are disclosed in, e.g., U.S. Pat. No. 6,090,356 and US 2006/0196357 A1.

Any suitable solvent can be used for the absorbers 200 and 300. Usually, the solvent can include at least one of a dimethyl ether of polyethylene glycol (sold under the trade designation SELEXOL by Dow Chemical Company of Midland, Mich.), a N-methyl pyrrolidone, a tetrahydro-1,4-oxazine (also may be referred to as morpholine), a methanol, and a mixture comprising diisopropanolamine and tetrahydrothiophene-1, 1-dioxide (also can be referred to as sulfolane). Generally, three types of solvents are used in the acid gas removal zone 10, namely a lean solvent stream having less than about 1 ppm, by weight, of carbon dioxide and hydrogen sulfide, a partially-lean solvent stream having about 0.5-about 5%, by mole, carbon dioxide and less than about 1 ppm, by weight, of hydrogen sulfide, and a loaded solvent having about 15-about 40%, by mole, carbon dioxide and less than about 1 ppm, by weight, of hydrogen sulfide.

The acid gas removal zone 10 can receive a sour gas stream 50. A sour gas may include at least one of carbon dioxide and hydrogen sulfide, such as a syngas with unacceptable amounts of carbon dioxide and hydrogen sulfide. The sour gas can originate from an overhead stream of a hydrogen sulfide absorber, a coal gasification plant, or a direct-oxidative process. In some instances, the sour gas can include at least about 18%, or even about 45%, by volume, of carbon dioxide.

The sour gas stream 50 can be received by a heat exchanger 70 which can cool the sour gas stream 50 with an overhead stream 310 from the carbon dioxide absorber 300, as hereinafter described. The sour gas stream 50 can be received by the first absorber 200 near its bottom. In addition, the first absorber 200 may also receive another stream 240 that may also include hydrogen sulfide. Typically, this second stream 240 can be a recycle stream from a hydrogen sulfide concentrator. The hydrogen sulfide absorber 200 can include one or more beds 210, and in this exemplary embodiment can include first and second beds 210 although any suitable number of beds 210 may be used. A slipstream 250 of a solvent can be provided near the top of the absorber 200 to remove hydrogen sulfide. A treated gas can rise and exit the absorber 200 as an overhead stream 230. In addition, a bottom stream 280 can exit including a loaded solvent rich in impurities such as hydrogen sulfide and carbon dioxide. This stream can be sent for treatment to remove such compounds.

The overhead stream 230 that may have less than about 1 ppm, by weight, of hydrogen sulfide can be sent to a pump-around circuit 340 for the second absorber 300. The stream 230 can be combined with a chilled stream 358 from a discharge from a pump-around circuit fluid transfer device 362 (as hereinafter described). The combined streams 230 and 358 may be provided to a flash drum 344. The flash drum 344 can provide a vapor stream 346 and a liquid stream 348. The vapor stream 346 can be obtained and sent to the second absorber 300. The liquid stream 348 can have a portion removed as a slipstream 250. Generally, the slipstream 250 is saturated with carbon dioxide but is relatively free of hydrogen sulfide. The slipstream 250 can be provided to a slipstream fluid transfer device 252, typically a pump 252, and then sent to a slipstream chiller 256 before being sent to the first absorber 200.

Another portion 356 of the liquid stream 348 can be provided to the second absorber 300. The second absorber 300 can include at least one absorber bed 302, typically first, second and third beds 302, although any suitable number of beds 302 may be utilized. What is more, the second absorber 300 may also receive a partially lean solvent return stream 306. Additionally, the carbon dioxide absorber 300 can receive a lean solvent stream 320 that passes through a lean solvent chiller 324 before entering the carbon dioxide absorber 300.

Typically, the gases entering via the vapor stream 346 rise within the absorber 300 and are washed with the lean solvent stream 320 and the partially lean solvent stream 306. Usually after the gases pass through a demister 308, which can be a vane or mesh demister, an overhead stream 310 containing treated gases may then be passed through the heat exchanger 70, as described above.

A side-stream 352 can be withdrawn from the absorber 300 as a suction to the pump-around fluid transfer device 362, typically a pump 362. Afterwards, the pump 362 can provide the stream 358 through a pump-around solvent chiller 366 before the stream 358 is combined with the stream 230. A bottom stream 380 can be removed from the carbon dioxide absorber 300 and sent to a series of flash drums to remove carbon dioxide and be recycled back to the absorber 300 as the partially lean solvent stream 306. The combination of the stream 358 and the stream 230, and subsequent separation in the flash drum 344 can inexpensively improve removal of hydrogen sulfide by effectively adding at least one stage to the hydrogen sulfide absorber 200.

Figure 2:
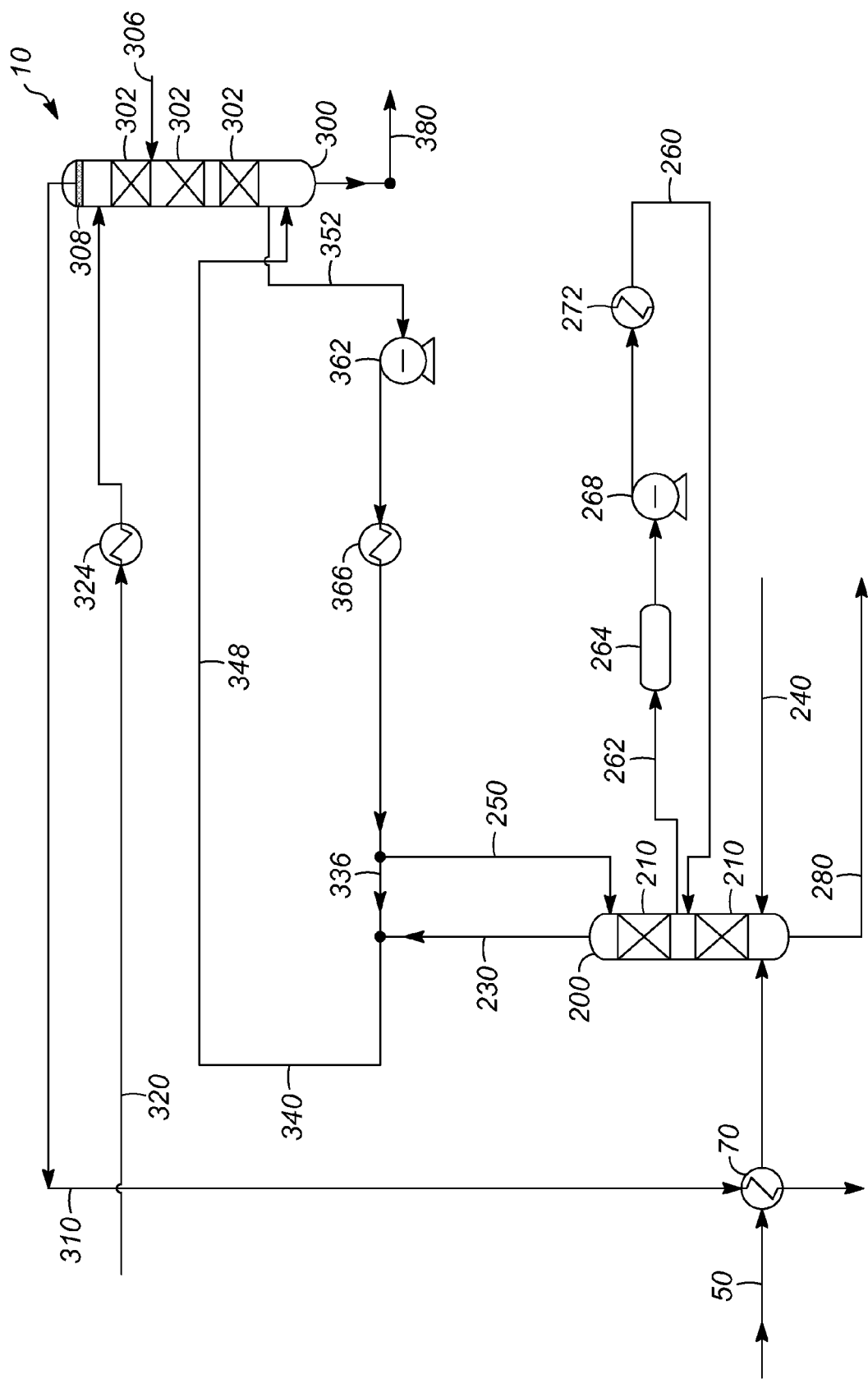
FIG. 2 is another version of the exemplary acid gas removal zone.

Referring to FIG. 2, another version of the acid gas removal zone 10 is depicted. This version of the zone 10 can include the heat exchanger 70, the absorber 200, the absorber 300, the lean solvent chiller 324, the pump-around fluid transfer device 362, such as a pump 362, and the pump-around solvent chiller 366, as discussed in the version depicted in FIG. 1. This version can use a side-stream circuit 260 to reduce the capital requirements for the absorber 200. The side-stream circuit 260 may include a holding tank 264, a side-stream fluid transfer device 268, typically a pump 268, and a side-stream chiller 272. Generally, a side-stream 262 is withdrawn from the hydrogen sulfide absorber 200. This side-stream 262 can be provided to the holding tank 264. Usually, the side-stream 262 can be passed through the holding tank 264 to provide capacity for the first fluid transfer device 268. Particularly, the holding tank 264 can provide sufficient volume for maintaining a liquid head for the pump 268. Subsequently, the pump 268 can provide the side-stream 262 to the side-stream chiller 272 that can remove heat caused by carbon dioxide absorption before returning the side-stream 262 to the hydrogen sulfide absorber 200. In one preferred embodiment, the chiller can be a stab-in chiller, i.e., having a tube bundle inserted into the absorber 200. Generally, the side-stream circuit 260 can reduce capital costs by removing the extra height that could be required due to increased temperatures as a result of carbon dioxide absorption exotherm.

The overhead stream 230 can exit the top of the absorber 200 and be sent to the pump-around circuit 340. Usually, the stream 230 is merged to form a substantially liquid stream 348 provided near the bottom of the absorber 300. A side-stream 352 can be withdrawn from the absorber 300 and provided as a suction of the pump 362. The discharge of the pump 362 can be provided to the pump-around solvent chiller 366 with the slipstream 250 to the absorber 200. A remaining portion 336 can be combined with the overhead stream 230, and then returned to the absorber 300, as discussed above. Generally, other processes of this version of the acid gas removal zone 10 as depicted in FIG. 2 can operate similarly as described above for FIG. 1.

Thus, the embodiments disclosed herein provide presaturation of the solvent with carbon dioxide prior to chilling by providing interstage cooling to effectively reduce the height requirements of the hydrogen sulfide absorber 200. Particularly, the side-stream 262 can be taken from the fourth or fifth stage from the top of the hydrogen sulfide absorber 200. At this point, the solvent may be saturated with carbon dioxide and has achieved the maximum possible temperature due to the absorption exotherm. Generally, the side-stream circuit 260 can provide about 80-about 85% of the solvent and utility savings. The savings may be slightly reduced because about two-about three stages of contacting are generally needed to obtain full carbon dioxide absorption and exotherm. However, as depicted in FIG. 1, providing an additional stage of contacting with the flash drum 344 in the pump-around circuit 340 can reduce the number of stages in the expensive hydrogen sulfide absorber 200 by at least one. Moreover, stab-in chillers can provide potential savings as they can be placed in the hydrogen sulfide absorber 200 to remove substantially all heat associated with the carbon dioxide absorption exotherm.

The embodiments as disclosed in FIGS. 1 and 2 can be combined in a single zone 10. As an example, the acid gas removal zone 10 can include both the side-stream circuit 260 and the pump-around circuit 340, with any suitable modifications. Although one or more absorbers and absorber beds have been disclosed above, it should be understood that other devices may be used. Other devices can include, independently, one or more adsorbers, adsorber beds, packed beds, and/or trayed columns.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for increasing an efficiency of an acid gas removal zone, comprising:
   A) passing a hydrogen sulfide absorber effluent to a pump-around circuit for a carbon dioxide absorber wherein the pump-around circuit comprises:
      1) a flash drum;
      2) a fluid transfer device; and
      3) a chiller;
   B) providing a vapor stream and a liquid stream from the flash drum; and
   C) providing at least a portion of the liquid stream and the vapor stream to the carbon dioxide absorber.

2. The process according to claim 1, further comprising providing lean and partially lean solvent streams to the carbon dioxide absorber.

* * * * *